Feb. 26, 1957
M. D. RODGERS
2,783,136
METHOD AND APPARATUS FOR TREATING
ALKALI CELLULOSE PRIOR TO AGING
Filed March 24, 1953
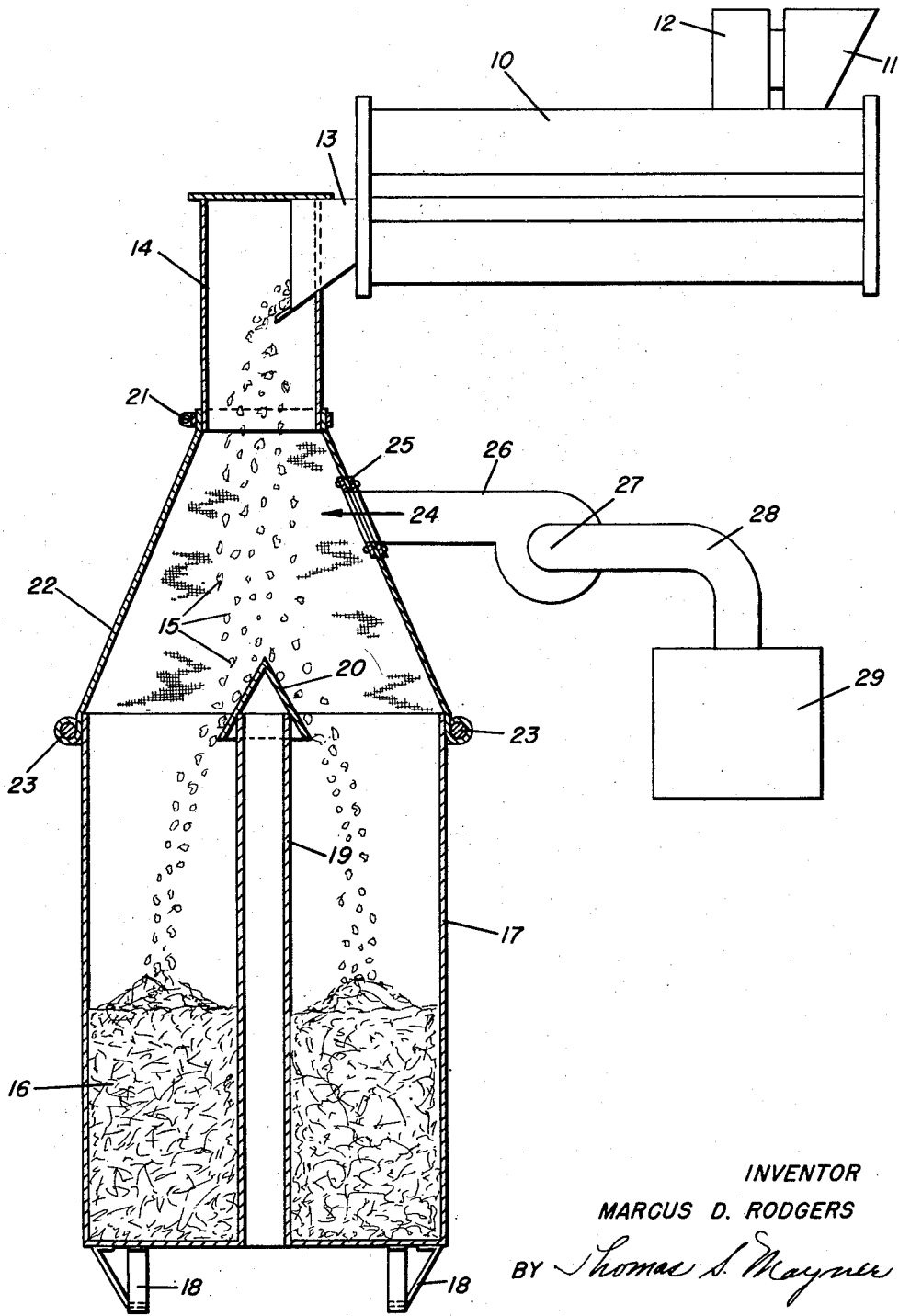
INVENTOR
MARCUS D. RODGERS
BY *Thomas S. Mayner*
ATTORNEY

United States Patent Office 2,783,136
Patented Feb. 26, 1957

2,783,136

METHOD AND APPARATUS FOR TREATING ALKALI CELLULOSE PRIOR TO AGING

Marcus D. Rodgers, Berea, Ohio, assignor to Industrial Rayon Corporation, Cleveland, Ohio, a corporation of Delaware Application March 24, 1953, Serial No. 344,443

3 Claims. (Cl. 23—260)

This invention relates to an improved method and apparatus for handling shredded alkali cellulose prior to aging. In particular, this invention relates to maintaining shredded alkali cellulose substantially free of carbon dioxide having an irregular and harmful influence on the shredded alkali cellulose.

Alkali cellulose crumbs, after aging, are xanthated with carbon bisulphide then dissolved in caustic soda in order to produce viscose. When ripened, the viscose is filtered prior to being spun into rayon. It is known that alkali cellulose may react with carbon dioxide in a manner analogous to its reaction with carbon bisulfide. It is believed that a prior reaction of alkali cellulose with carbon dioxide serves to block off and interfere with subsequent reactions with carbon bisulfide. When such interfering reactions occur, the alkali cellulose may be imperfectly xanthated with the result that viscose made therefrom becomes more difficult to filter.

The effects of exposure of shredded alkali cellulose to carbon dioxide in almost any quantity are most pronounced when the shredded crumbs of alkali cellulose are intimately contacted by an atmosphere which contains carbon dioxide, such as atmospheric air. When continuous shredders are employed to disintegrate alkali cellulose sheets to crumbs there is invariably an intimate exposure to carbon dioxide of the crumbs discharged from the shredder while falling through the atmosphere to fill an aging chamber, such as an aging can or bin. Alkali cellulose crumbs generate heat while undergoing an exothermic degradation reaction with oxygen during the aging which is normally subsequent to shredding. The rate of reaction between carbon dioxide and alkali cellulose crumb increases in proportion to temperature.

Alkali cellulose may be shredded and aged at an elevated temperature in order to decrease aging time thereby effecting an increase of productivity in equipment of a given capacity. When shredding and subsequent aging take place at elevated temperatures, especially above about 28° C., the filterability of the resulting viscose may be seriously lessened, and, as a consequence, slight overall benefit can be realized from the foreshortened aging.

In accordance with the present invention, shredded alkali cellulose being discharged from a shredder and collected in an aging chamber for subsequent batch aging is transferred in an atmosphere maintained substantially free of carbon dioxide. The discharge conduit from the shredder is provided with a skirt-like, flexible, air-tight hood which may be attached about its lower extremity to the upper peripheral edge of an aging chamber or can to be filled with shredded alkali cellulose. The passageway thus secured prevents carbon dioxide in the atmosphere from contacting the alkali cellulose crumbs falling into the aging can.

In order to maintain the atmosphere about the falling crumbs sustantially free of carbon dioxide, air at greater than atmospheric pressure, from which the carbon dioxide has been substantially removed by any suitable means is continuously passed through an inlet in the hood while the crumb mass is collected. After the can is sufficiently filled, it is normally sealed with an air-tight cover so that the crumbs are not further influenced by carbon dioxide during aging.

The accompanying drawing illustrates in elevation an embodiment of a method and a representative apparatus to handle shredded alkali cellulose in accordance with the present invention.

With reference to the drawing, a continuous shredder 10, generally shown, receives sheets of alkali cellulose through an inlet feed hopper 11. Spiral disintegrating arms positioned within the hopper 11 and activated by a suitable drive means 12 break up and shred the alkali cellulose sheets. The disintegrated alkali cellulose crumbs are passed through the shredder and are discharged through the outlet 13 into the exhaust or outlet conduit or chute 14.

The crumbs 15 fall through the conduit 14 to be collected as a shredded alkali cellulose mass 16 in the bottom of the aging chamber or can 17. The aging chamber 17 may be a receptacle of any configuration, cross-section or shape suitable for the aging of alkali cellulose. For instance, the aging chamber 17 may be a can with an annular cross-section having an open, heat-dissipating core 19 centrally positioned therein throughout the height of the can. The aging chamber 17 is supported by legs 18. A removable cone 20 is positioned on the upper open end of the core 19 while the chamber 17 is being filled to prevent crumbs dropping through the open core 19 onto a floor, and to evenly distribute the falling crumbs 15 while forming the collected mass 16 of shredded alkali cellulose.

Attached to the bottom of chute 14 by means of the collar 21 is a flexible frusto-conical, skirt-like hood or shroud 22. Preferably, the hood 22 is made of substantially an air-tight material such as of rubber or of impregnated fabric, and like materials. At its lower extremity, the hood 22 is provided with a ring weight 23 joined to the hood and adapted to encircle the top of the chamber 17. The ring weight 23 has an interior circumference slightly larger than the outer circumference of the can 17 so that it and the flexible hood 22 to which it is attached can be easily slipped on or off the top of the aging chamber 17 thereby providing a coupling with the conduit 14 and forming a passageway for the falling crumbs 15 which seals or protects them from contact with atmospheric air containing carbon dioxide. The flexible hood 22 can be attached to the top of the aging chamber 17 by any other suitable means desired, such as by a collar, grommet securing means, drawstring, elastic string, etc., just as long as it is securely positioned thereon so as to complete an enclosed passageway from and including the conduit 14 and outlet 13.

Air from which carbon dioxide has been substantially eliminated and at greater than atmospheric pressure is passed into the hood 22 through the air inlet port 24 after being pumped through the blower 27. The air passes from the blower 27 through the duct 26 which is connected to the hood 22 by a flanged connecting means 25 to form the air inlet port 24. The blower 27 brings air substantially free of carbon dioxide from the carbon dioxide removing means 29 through an interconnecting duct 28. The carbon dioxide removing means may be any suitable means adapted to remove carbon dioxide from air, such as soda-lime scrubbers or the like.

After the aging chamber 17 is filled with shredded alkali cellulose 16, the hood 22 is quickly removed and it is replaced with another cover (not shown); another can is then covered with the hood and filled in a like manner. As mentioned, the aging cans are normally provided with air-tight covers during aging so as to keep the mass of alkali cellulose crumbs from contact with atmospheric air.

If desired, the flexible hood 22 may be made of a permeable material which allows some penetration of air provided that sufficient air substantially free of carbon dioxide is admitted through air inlet port 24 under adequate pressure to effect an outward seepage through the permeable hood 22 and maintain the falling crumbs 15 out of contact with atmospheric air. It is advantageous, however, to use an air-tight material for the flexible hood 22 there being sufficient leakage through the various connections forming the passageway for the crumbs from the shredder to the aging chamber.

The present invention is especially adapted for continuous shredding operations when the alkali cellulose crumbs are discharged into individual aging chambers for subsequent aging in batches.

Since certain changes in practicing the invention may be made without departing from its scope, it is to be understood that all the foregoing be interpreted as merely illustrative and in no sense limiting of the invention.

What is claimed is:

1. In combination with a continuous shredder for alkali cellulose having a discharge outlet positioned above an aging chamber into which shredded alkali cellulose crumbs fall, apparatus comprising a flexible hood connecting said discharge outlet to said aging chamber, said hood forming an enclosed passageway and being adapted to exclude entrance of atmospheric air to said passageway; and means supplying air substantially free of carbon dioxide attached to said hood to maintain an atmosphere in said hood substantially free of carbon dioxide.

2. In combination with a continuous shredder for disintegrating alkali cellulose at a temperature above about 28° C. and having a discharge outlet positioned above an aging chamber into which shredded alkali cellulose crumbs fall, apparatus comprising a removable, flexible hood connecting said discharge outlet to the upper periphery of said aging chamber; said hood forming an enclosed passageway and being adapted to exclude entrance of atmospheric air to said passageway; an air inlet in said hood; an air pump connected by a duct to said air inlet; and means to supply air maintained substantially free of carbon dioxide to said air pump.

3. In combination with a shredder for alkali cellulose having a discharge outlet joining an aging chamber into which shredded alkali cellulose crumbs fall, apparatus comprising, a flexible hood connecting said discharge outlet into said aging chamber, said hood forming an enclosed passageway and being adapted to exclude entrance of atmospheric air to said passageway, and means supplying air substantially free of carbon dioxide attached to said hood to maintain an atmosphere in said hood substantially free of carbon dioxide.

References Cited in the file of this patent

UNITED STATES PATENTS

| | | |
|---|---|---|
| 1,713,237 | Morin | May 14, 1929 |
| 2,218,836 | Horst | Oct. 22, 1940 |
| 2,287,897 | Martin | June 30, 1942 |
| 2,490,097 | Seaman et al. | Dec. 6, 1949 |